(12) United States Patent
Ogasawara et al.

(10) Patent No.: US 10,226,845 B2
(45) Date of Patent: Mar. 12, 2019

(54) MACHINE TOOL

(71) Applicant: STAR MICRONICS CO., LTD., Shizuoka-shi (JP)

(72) Inventors: Hiroyuki Ogasawara, Shizuoka (JP); Motohiro Kawamura, Shizuoka (JP)

(73) Assignee: STAR MICRONICS CO., LTD., Shizuoka-Shi (JP)

( * ) Notice: Subject to any disclaimer, the term of this patent is extended or adjusted under 35 U.S.C. 154(b) by 0 days.

(21) Appl. No.: 15/869,006

(22) Filed: Jan. 11, 2018

(65) Prior Publication Data

US 2018/0264610 A1  Sep. 20, 2018

(30) Foreign Application Priority Data

Mar. 14, 2017 (JP) .................... 2017-047990

(51) Int. Cl.
*B23Q 11/10* (2006.01)
*B23B 19/02* (2006.01)
(Continued)

(52) U.S. Cl.
CPC .......... *B23Q 11/005* (2013.01); *B23B 31/207* (2013.01); *B23Q 11/103* (2013.01);
(Continued)

(58) Field of Classification Search
CPC . B23Q 11/005; B23Q 11/1015; B23Q 11/103; B23Q 11/1084; B23B 2260/126; B23B 2270/30; B23B 31/207
See application file for complete search history.

(56) References Cited

U.S. PATENT DOCUMENTS 3,611,847 A * 10/1971 Derman .................. B26D 3/08
  264/159
4,117,750 A * 10/1978 Kopelev ............ B23Q 11/0883
  384/480
(Continued)

FOREIGN PATENT DOCUMENTS

EP  0467038  1/1992
EP  0978350  2/2000
(Continued)

OTHER PUBLICATIONS

EPO, Extended European Search Report of Application No. 18153882.8, dated Jul. 23, 2018.

*Primary Examiner* — Sara Addisu
(74) *Attorney, Agent, or Firm* — Lex IP Meister, PLLC

(57) ABSTRACT

A machine tool capable of facilitating a process of mounting a fluid supplying unit to a spindle supporting unit is provided. The machine tool has a rotating unit including a spindle provided with a workpiece chucking unit, a supporting unit which rotatably supports the spindle around a spindle axis, and a fluid supplying unit removably mounted on a rear end of the supporting unit to allow fluid flow inside the spindle toward the chucking unit. The fluid supplying unit has an insert to be received in the rotating unit in the direction of the spindle axis. A labyrinth clearance is formed between the outer circumferential surface of the insert and the inner circumferential surface of the rotating unit when the fluid supplying unit is mounted on the rear end of the supporting unit. The labyrinth clearance allows rotation of the rotating unit and restricts leakage of the supplied fluid from inside the spindle when the rotating unit is rotated.

1 Claim, 8 Drawing Sheets

(51) Int. Cl.
*B23Q 5/04* (2006.01)
*B23Q 11/00* (2006.01)
*B23B 31/20* (2006.01)

(52) U.S. Cl.
CPC .... *B23Q 11/1015* (2013.01); *B23B 2260/126* (2013.01); *B23B 2270/30* (2013.01); *B23Q 11/1084* (2013.01)

(56) References Cited

U.S. PATENT DOCUMENTS

| | | | | |
|---|---|---|---|---|
| 5,305,509 | A * | 4/1994 | Yuhara | F16J 15/406 277/347 |
| 5,732,608 | A * | 3/1998 | Francois | B23B 23/04 142/53 |
| 6,389,939 | B1 * | 5/2002 | Babuder | B23Q 11/0883 82/129 |
| 2007/0169596 | A1 * | 7/2007 | O'Connor | B23B 31/204 82/165 |
| 2009/0263202 | A1 * | 10/2009 | Takashima | B23Q 11/0883 409/135 |
| 2015/0033918 | A1 * | 2/2015 | Lindner | B23Q 5/043 82/1.11 |
| 2015/0090084 | A1 * | 4/2015 | Kotake | B23B 7/06 82/162 |

FOREIGN PATENT DOCUMENTS

| | | |
|---|---|---|
| JP | 04210307 | 7/1992 |
| JP | 2009-172725 | 8/2009 |

* cited by examiner

MACHINE TOOL

CROSS-REFERENCE TO RELATED APPLICATION

This application claims priority of Japanese Patent Application No. 2017-047990 filed on Mar. 14, 2017. The contents of this application are incorporated herein by reference in their entirety.

BACKGROUND OF THE INVENTION

The invention relates to a machine tool provided with a fluid supplying unit which supplies fluid to a workpiece chucking unit via a spindle.

It is known that a front face of a workpiece is machined by a headstock and a tool post and then a back face of the workpiece chucked by a collet of a sub spindle is machined by a backworking unit. In such a lathe, oil or air is supplied to the sub spindle to block cut chips from entering the sub spindle through a slit of the collet. Japanese patent application publication No. 2009-172725, especially the paragraph 0035 discloses a backworking unit provided with a blow air supplying mechanism and a cutting oil supplying mechanism.

SUMMARY

Switching product ejecting apparatuses needs replacement of parts according to product ejecting methods. When a fluid supplying unit which supplies blow oil or blow air is removably mounted on a supporting unit of a sub spindle, a fluid seal needs be considered. When fluid is supplied from the stationary fluid supplying unit to a rotatable spindle, a clearance is necessarily provided between them. A wider clearance leaks more fluid, resulting in less oil or less air supplied to the collet and deficient removal of cut chips. A narrower clearance causes an interference of the spindle with the fluid supplying unit due to thermal expansion of the spindle. It is difficult for an operator to adjust the clearance to a constant value in replacing the parts. Parts replacement would take time and a wider clearance unintentionally adjusted would leak more fluid. The problem is not limited to a lathe provided with a backworking unit, but applied to various kinds of machine tools.

The present invention discloses a machine tool capable of facilitating a process of mounting the fluid supplying unit to the supporting unit which rotatably supports the spindle.

The machine tool of the invention comprises a rotating unit including a spindle provided with a chucking unit which releasably chucks a workpiece, a supporting unit which rotatably supports the spindle around an axis of the spindle; and a fluid supplying unit removably mounted on the supporting unit to supply fluid to the chucking unit via the spindle. The fluid supplying unit has an insert to be received in the rotating unit in the direction of the axis of the spindle. The rotating unit has an inner circumferential surface opposite an outer circumferential surface of the insert received in the rotating unit. A labyrinth clearance is formed between the outer circumferential surface of the insert and the inner circumferential surface of the rotating unit when the fluid supplying unit is mounted on the supporting unit. The labyrinth clearance allows rotation of the rotating unit and restricts leak of fluid from the spindle when the rotating unit is rotated.

The present invention provides a machine tool capable of facilitating a process of mounting the fluid supplying unit to the supporting unit which rotatably supports the spindle.

DETAILED DESCRIPTION

Hereinafter, an embodiment of the present invention will be described. The invention is not limited to the exemplary embodiment and the features disclosed herein are necessarily not essential to the invention.

(1) Summary of Technology Included in the Present Invention

Technology included in the invention will be described with reference to FIG. 1 to FIG. 8. The drawings only schematically show an example of the invention. They may have a mismatch to each other due to different magnification in each direction. Each element denoted by a symbol is only an example.

A machine tool 1 comprises a rotating unit U1, a supporting unit U2, ant a fluid supplying unit U3. The rotating unit U1 includes a spindle (a sub spindle 52, for example) provided with a chucking unit 60 for releasably chucking a workpiece W1. The supporting unit U2 rotatably supports the sub spindle 52 around a spindle axis AX1. The fluid supplying unit U3 is removably mounted on the supporting unit U2 to supply fluid to the chucking unit 60 via the sub spindle 52. The fluid supplying unit U3 has an insert P1 to be received in the rotating unit U1 in the direction of the spindle axis (the Z-axis direction). The rotating unit U1 has an inner circumferential surface U1$i$ opposite an outer circumferential surface P1$o$ of the insert P1. When the fluid supplying unit U3 is mounted on the supporting unit U2, a labyrinth clearance C1 is formed between the outer circumferential surface P1$o$ of the insert P1 and the inner circumferential surface U1$i$ of the rotating unit U1. The labyrinth clearance C1 allows rotation of the rotating unit U1 and restricts leak of fluid from the sub spindle 52 when the rotating unit U1 is rotated.

Figure 8:
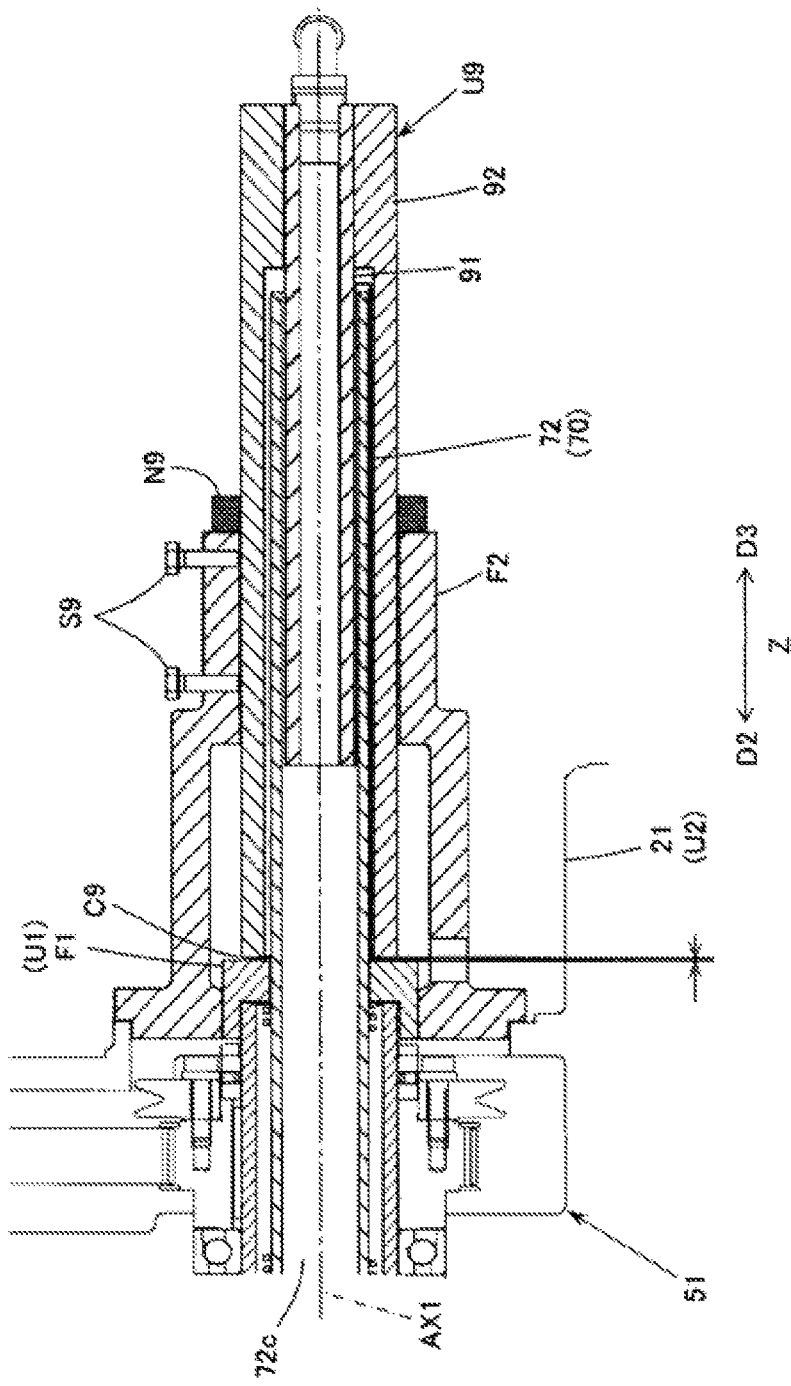
FIG. 8 is a longitudinal section view of a comparative example of a backworking unit where a fluid supplying unit is mounted.

As fully described later, in a comparative example as shown in FIG. 8, it is difficult and time consuming for an inexperienced operator to invisibly provide a clearance C9 in the direction of the spindle axis between a rear end of a flange F1 of the rotating unit U1 and a front end of an outer pipe of a fluid supplying unit U9. In the embodiment of the invention, in a state that the fluid supplying unit U3 is mounted on the supporting unit U2, the rotating unit U1 is rotatable with respect to the fluid supplying unit U3 and the labyrinth clearance C1 formed between the outer circumferential surface P1o of the insert P1 and the inner circumferential surface U1i of the rotating unit U1 to restrict leak of fluid from the sub spindle 52 when the rotating unit U1 is rotated. Accordingly, the embodiment provides a machine tool capable of facilitating a process of mounting the fluid supplying unit to the supporting unit which rotatably supports the spindle.

The spindle is not limited to the sub spindle and may be a main spindle. The chucking unit comprises various chucking means for holding the workpiece such as a collet and claw. The fluid comprises liquid and gas such as blow oil and blow air. The workpiece comprises a product. The labyrinth clearance comprises a clearance where a labyrinth phenomenon is observed due to rotation of the rotating unit and a clearance where a seal effect is generated. The labyrinth clearance may be a clearance fit in accordance with ISO (International Organization for Standardization) 286-2:2010 and JIS (Japanese Industrial Standard) B0401-2:2016; "Geometrical product specifications (GPS) ISO code system for tolerances on linear sizes—Part 2: Tables of standard tolerance classes and limit deviations for holes and shafts".

(2) Example of Machine Tool Configuration

Figure 1:
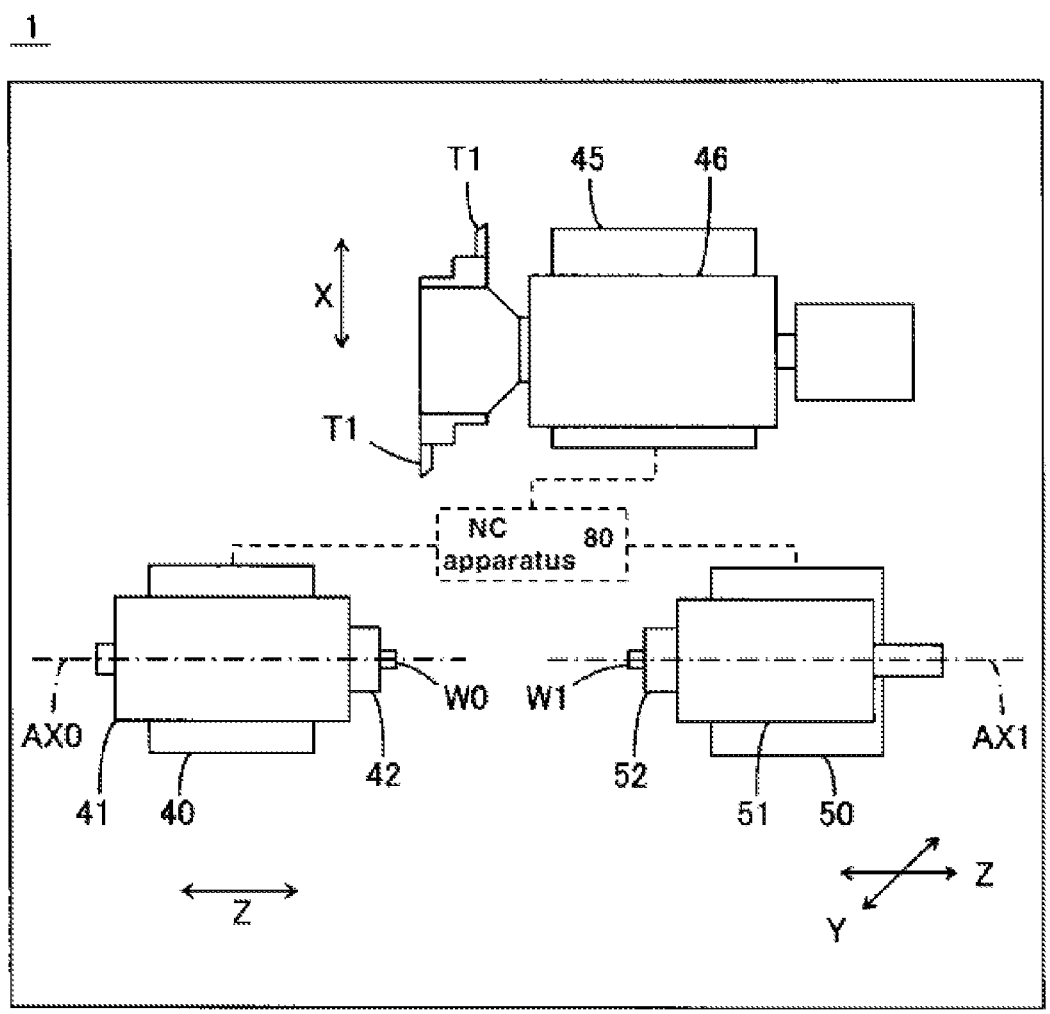
FIG. 1 schematically shows an example of configuration of a machine tool.

FIG. 1 schematically shows an example of configuration of the machine tool. The machine tool 1 comprises an NC apparatus 80, a headstock 41 mounted on a stationary base 40, a backworking unit 51 mounted on a stationary base 50, and a tool post 46 mounted on a stationary base 45. The NC apparatus 80 controls the headstock 41, the backworking unit 51, and the tool post 46.

The headstock 41 is movable in the Z-axis direction along a main spindle axis AX0. The NC apparatus 80 controls the Z-axis position of the headstock 41 via a not-shown driving unit thereof. The headstock 41 is provided with a main spindle 42. The main spindle 42 releasably chucks a cylindrical or bar workpiece W0 by a not-shown collet to rotate the workpiece W0 on the main spindle axis AX0 along the longitudinal direction of the workpiece W0. The Z-axis direction may be the horizontal direction in the embodiment but not limited thereto.

The backworking unit 51 is movable in the Z-axis direction along the spindle axis AX1 and in a Y-axis direction perpendicular to the Z-axis direction. The NC apparatus 80 controls the Z-axis position and the Y-axis position of the backworking unit 51 via a not-shown driving unit thereof. The backworking unit 51 is provided with the sub spindle 52. The sub spindle 52 releasably chucks the workpiece W1 whose front face has been machined. The workpiece W1 is rotated by the sub spindle 52 on the spindle axis AX1. The sub spindle 52 is called an opposite spindle since it is opposite the main spindle 42. The Y-axis direction may be the horizontal direction in the embodiment but not limited thereto.

The tool post 46 has a plurality of tools T1 for machining the workpiece W0, W1 attached thereto. The tool post 46 is movable in an X-axis direction perpendicular to the Z-axis direction and the Y-axis direction. The NC apparatus 80 controls the X-axis position of the tool post 46 via a not-shown driving unit thereof. The X-axis direction may be the vertical direction in the embodiment but not limited thereto. The tool post may be a turret tool post or a gang tool post. Various types of tool posts are available. The moving direction of the headstock 41, the backworking unit 51, and the tool post 46 is not limited to the direction as shown in FIG. 1.

Figure 2:
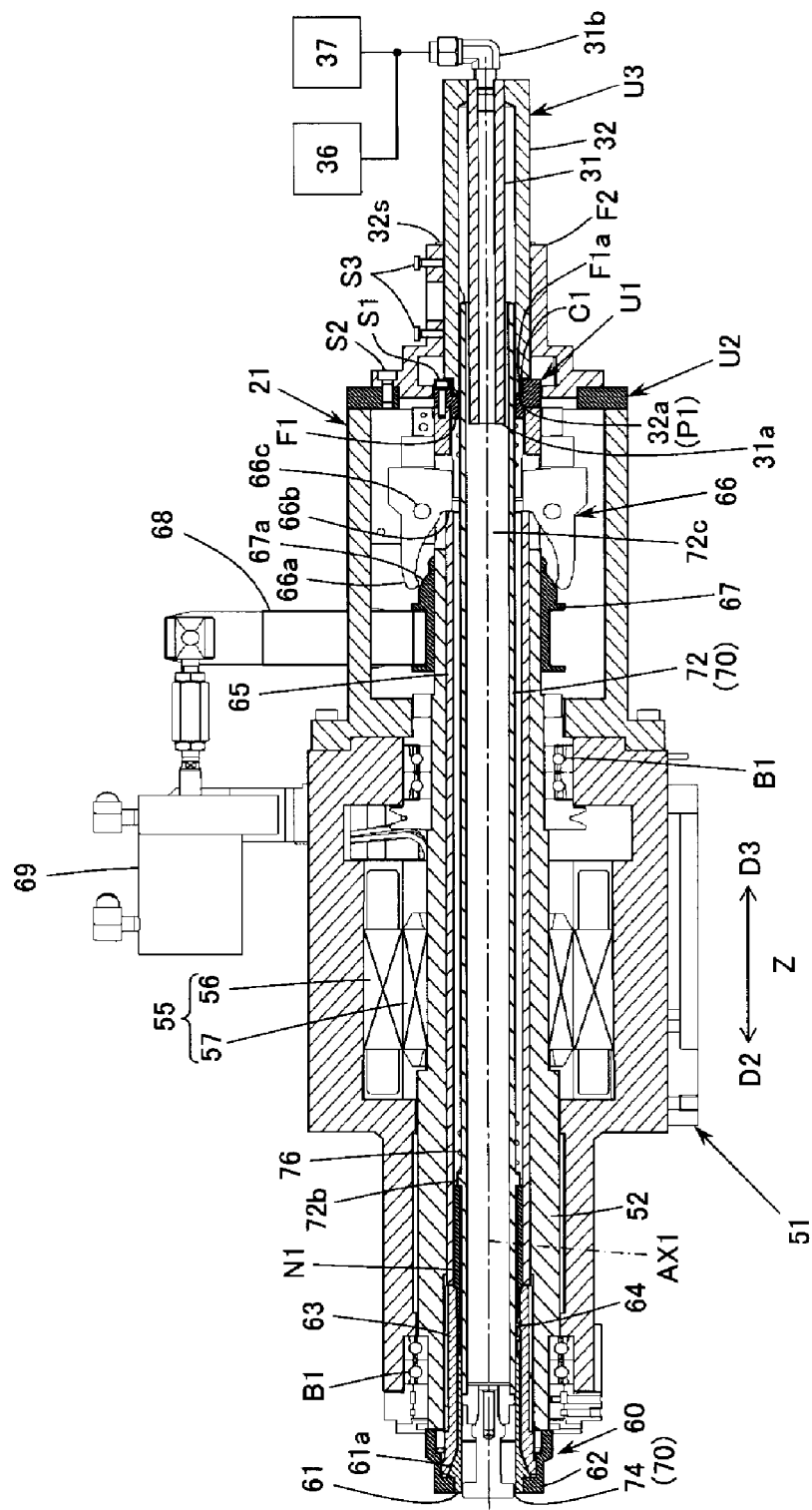
FIG. 2 is a longitudinal section view of a backworking unit where a fluid supplying unit is mounted.
Figure 3:
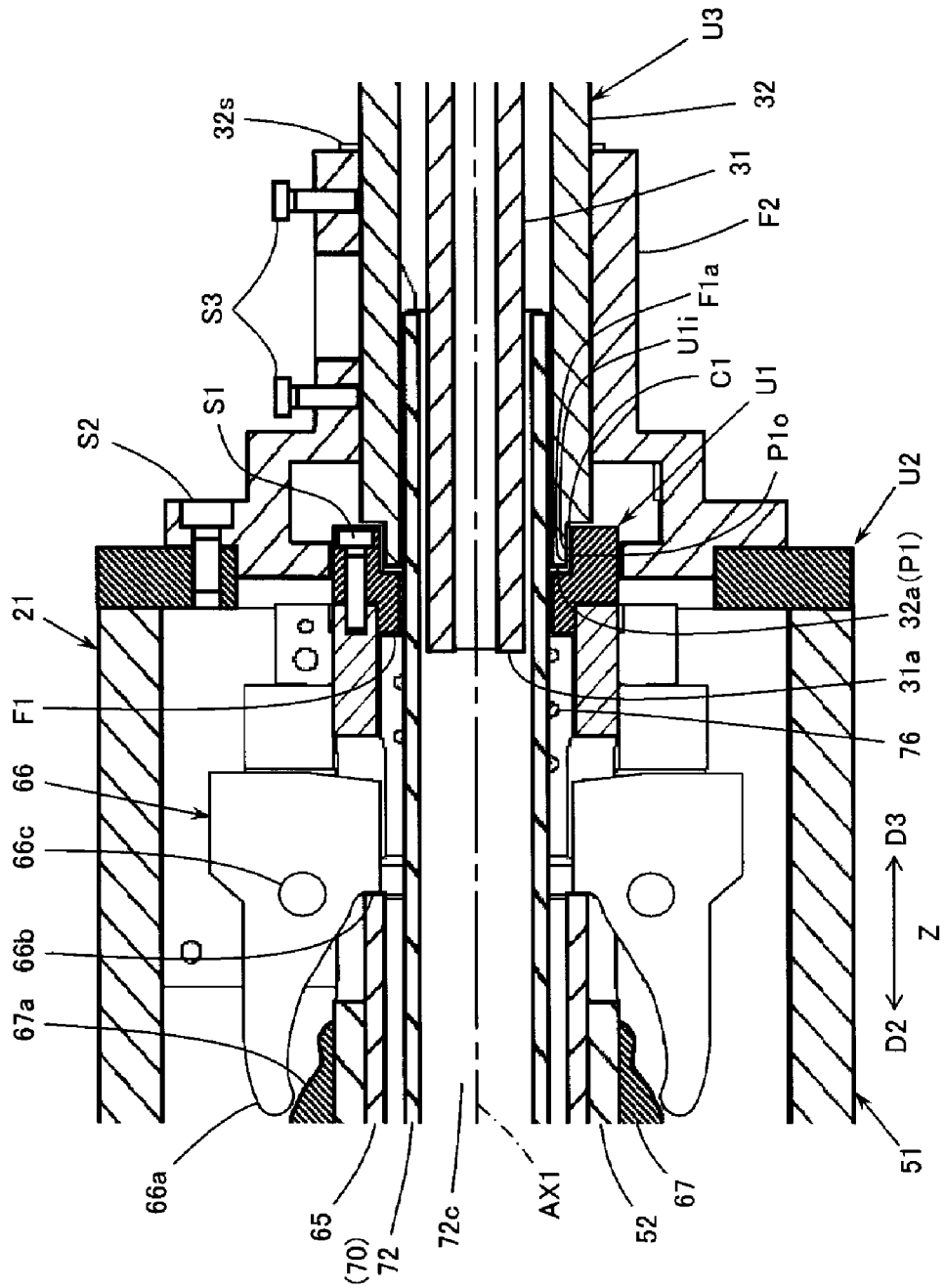
FIG. 3 is an expanded longitudinal section view of an insert and the neighborhood of the fluid supplying unit.

FIG. 2 is a longitudinal section view along the spindle axis of the backworking unit provided with the sub spindle as an example of a spindle of an embodiment of the invention. FIG. 3 is an expanded longitudinal section view of an insert and the neighborhood of the fluid supplying unit. The backworking unit 51 comprises the rotating unit U1 having the sub spindle 52 provided with the chucking unit 60, the supporting unit U2 which rotatably supports the sub spindle 52, the product ejector 70, and the fluid supplying unit U3. The combination of the product ejector 70 and the fluid supplying unit U3 is replaceable by another part such as a product passage pipe U4.

The sub spindle 52 has a through-hole along the spindle axis AX1. The sub spindle 52 is rotatably attached to a body 21 of the supporting unit U2 via a bearing B1. The sub spindle 52 is provided with a chuck sleeve 63 and a push sleeve 65 inserted in the Z-axis direction (the direction of the spindle axis). A sleeve nut N1 for the product ejector 70 is removably attached to the chuck sleeve 63. The sleeve nut N1, the chuck sleeve 63, and the push sleeve 65 each has a through-hole along the spindle axis AX1 through which the product ejector 70 is inserted in the Z-axis direction. The sub spindle 52 along with the chuck sleeve 63 and the push sleeve 65 is rotated on the spindle axis AX1 around the product ejector 70. A built-in motor 55 is mounted around the sub spindle 52, comprising a stator 56 on the side of the supporting unit body 21 and a rotor 57 on the side of the sub spindle 52. The sub spindle 52 is driven by the motor 55 under control of the NC apparatus 80.

The chucking unit 60 comprises a collet 61, a cap 62, and a collet open/close mechanism 63 to 69. The chucking unit 60 chucks the workpiece W1 inserted in the sub spindle 52 and releases it after the back face of the workpiece W1 is machined. The collet 61 is attached to the front end of the sub spindle 52 to releasably chuck the workpiece W1 supplied from the headstock 41. The collet 61 is rotated along with the sub spindle 52. The collet 61 is provided with a taper part 61a made gradually thinner toward the rear. The taper part 61a has a slit at a plurality of spots (three spots, for example). The cap 62 is attached to the front end of the sub spindle 52 to hold the collet 61.

The collet open/close mechanism comprises the chuck sleeve 63, a coil spring 64 for opening the collet, the push sleeve 65, a claw 66, a shifter 67, a shifter lever 68, and an actuator 69 for opening/closing the collet. The chuck sleeve 63 is in contact with the taper part 61a of the collet 61 and slidable in the Z-axis direction. The spring 64 is suspended on the collet 61 at the side of an advancing direction D2 thereof while on the inner circumferential surface of the chuck sleeve 63 at the side of a retracting direction D3 thereof. The spring 64 thereby urges the chuck sleeve 63 toward the retracting direction D3. The advancing direction D2 is a direction in which the workpiece W1 is pushed out toward the front side of the sub spindle 52 along the Z-axis direction. The retracting direction D3 is opposite the advancing direction D2. The push sleeve 65 is in contact with the rear end of the chuck sleeve 63 and slidable in the Z-axis direction. The claw 66 has a distal end 66a, a base 66b, and a shaft 66c. The distal end 66a is in contact with a taper part 67a of the shifter 67. The base 66b is in contact with the rear end of the push sleeve 65. The claw 66 is tilted around the shaft 66c. The claw 66 is rotated along with the sub spindle 52. The taper part 67a of the shifter 67 is made gradually thinner toward the rear. The shifter 67 is slidable in the Z-axis direction. The shifter 67 is driven by the shifter lever 68. The shifter lever 68 is driven by the actuator 69 under control of the NC apparatus 80.

When the shifter 67 slides in the retracting direction D3 via the shifter lever 68 by the actuator 69, the claw 66 is rotated so that the distal end 66a thereof is moved away from the spindle axis AX1. The chuck sleeve 63 then slides in the advancing direction D2 via the push sleeve 65 by the base 66b of the claw 66. The collet 61 is then closed to chuck the workpiece W1. When the shifter 67 slides in the advancing direction D2 via the shifter lever 68 by the actuator 69, the chuck sleeve 63 and the push sleeve 65 are retracted by urging force of the spring 64. Accordingly the claw 66 is rotated so that the distal end 66a thereof is moved toward the spindle axis AX1. The collet 61 is then opened to release the back-machined workpiece W1.

The product ejector 70 is inserted inside the chuck sleeve 63 and the push sleeve 65 to be movable in the Z-axis direction. The product ejector 70 comprises a nearly cylindrical product ejecting shaft 72 and an ejection pin 74 removably attached to the front end of the ejecting shaft 72. The ejecting shaft 72 is provided with a through-hole 72c extended in the Z-axis direction. A coil spring 76 for ejecting a product (the workpiece W1) is suspended outside of the ejecting shaft 72. The spring 76 is compressed in the Z-axis direction to be suspended on a larger diameter portion 72b of the ejecting shaft 72 at the front end thereof while on a flange F1 of the rotating unit U1 at the rear end thereof. The workpiece W1 whose front face has been machined is inserted in the loosened collet 61 and chucked thereby. The back face of the workpiece W1 is machined and the collet 61 is opened. The product (the workpiece W1) is ejected toward the advancing direction D2 by urging force of the spring 76. The flange F1 is provided with a recess F1a for receiving the insert P1 of the fluid supplying unit U3. The flange F1 is inside the flange F2 of the supporting unit U2 and fastened to the rear end of the sub spindle 52 by a screw S1. The flange F2 of the supporting unit U2 is fastened to the rear end of the supporting unit body 21 by a screw S2.

The fluid supplying unit U3 removably attached to the rear end of the supporting unit U2 comprises a fluid pipe 31 for blow oil and blow air and an outer pipe 32 surrounding the fluid pipe 31. The fluid pipe 31 and the outer pipe 32 are arranged along the spindle axis AX1. The front end 31a of the fluid pipe 31 is inserted in the rear end of the ejecting shaft 72. The rear end 31b of the fluid pipe 31 is connected to an oil supplying unit 36 and a pressure air supplying unit 37 to selectively supply blow oil and blow air. Blow oil from the oil supplying unit 36 is supplied to the collet 61 via the fluid pipe 31 and the through-hole 72c of the ejecting shaft 72. Cut chips are thereby removed. Blow air from the pressure air supplying unit 37 is supplied to the collet 61 via the fluid pipe 31 and the through-hole 72c of the ejecting shaft 72. Cut chips are thereby removed. The outer periphery of the outer pipe 32 is held by a stop ring 32s in contact with the rear end of the flange F2. The outer pipe 32 is inserted in the flange F2 of the supporting unit U2 and fastened thereto by screws S3. The front end 32a of the fastened outer pipe 32 is inserted in the recess F1a of the flange F1 of the rotating unit U1. Accordingly, the front end 32a of the outer pipe 32 is an example of the insert P1 to be received in the rotating unit U1 in the Z-axis direction. Between the outer circumferential surface P1o of the front end 32a of the outer pipe 32 and the inner circumferential surface U1i of the recess F1a of the flange F1, the labyrinth clearance C1 is formed to allow rotation of the rotating unit U1 and to restrict fluid leak from the sub spindle 52 when the rotating unit U1 is rotated.

Figure 4:
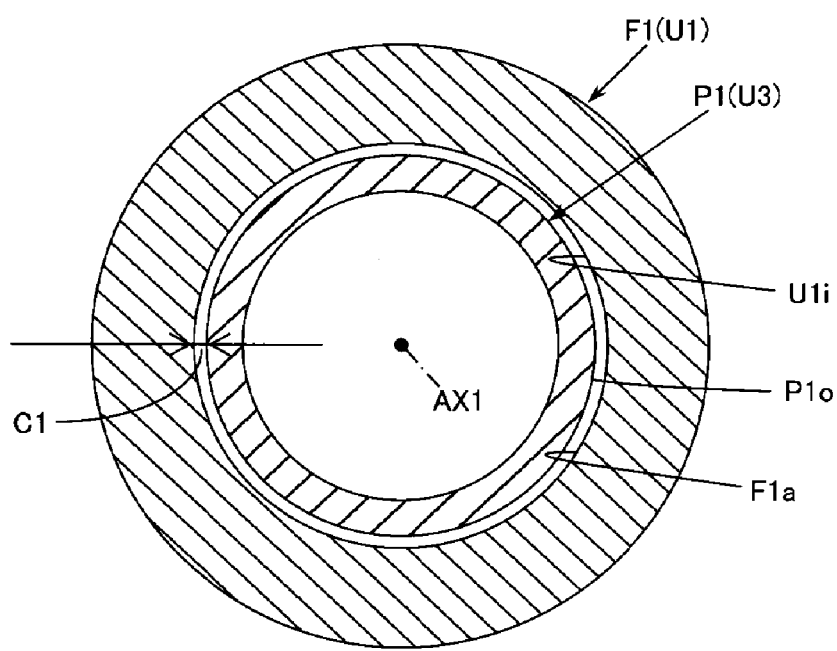
FIG. 4 is a longitudinal section view of a labyrinth clearance formed between an outer circumferential surface of the insert of the fluid supplying unit and an inner circumferential surface of a rotating unit.

FIG. 4 is an expanded section view of the insert P1 of the fluid supplying unit U3 and the flange F1 of the rotating unit U1. The other portions are not shown. The outer circumferential surface P1o of the insert P1 is circular in section shape. The inner circumferential surface U1i of the flange F1 is circular in section shape. There is a clearance fit between the outer circumferential surface P1o and the inner circumferential surface U1i in accordance with ISO 286-2:2010 and JIS B0401-2:2016. The labyrinth clearance C1 is thereby formed between them. For example, in view of fit tolerance of larger than 30 mm and less than 50 mm in diameter, the outer circumferential surface P1o can be set at a reference value of −142 μm or more and a reference value of −80 μm or less in diameter. The inner circumferential surface U1i can be set at a reference value of +80 μm or more and a reference value of −142 μm or less in diameter. This is only an example. The labyrinth clearance C1 may be variously set as far as rotation of the rotating unit U1 is allowed and fluid leak from the sub spindle 52 is restricted when the rotating unit U1 is rotated.

As shown in FIGS. 2 and 3, the outer circumferential surface P1o of the insert P1 and the inner circumferential surface U1i of the flange F1 are parallel to the spindle axis AX1 in a longitudinal section view along the spindle axis AX1. The labyrinth clearance C1 is formed along the spindle axis AX1. Accordingly, when the fluid supplying unit U3 is attached to the supporting unit U2, the labyrinth clearance C1 is formed only by inserting the insert P1 into the recess F1a of the flange F1 in the Z-axis direction, thereby eliminating the need of clearance adjustment work.

When rotation of the rotating unit U1 is stopped, blow oil in the through-hole 72c of the ejecting shaft 72 gradually flows in the retracting direction D3 along the outer periphery of the fluid pipe 31, flows in the advancing direction D2 between the outer periphery of the ejection shaft 72 and the inner periphery of the outer pipe 32, and finally leaks through between the flange F1 and the front end 32a of the outer pipe (including the labyrinth clearance C1). Blow air similarly flows. When rotation of the rotating unit U1 is resumed, a labyrinth phenomenon is observed and a seal effect is generated at the labyrinth clearance C1. Leak of blow oil or blow air from the sub spindle 52 is thereby restricted.

(3) Parts Replacement of the Embodiment

Removing the product passage pipe U4 from the back-working unit 51 and mounting the project ejector 70 and the fluid supplying unit U3 is being described.

Figure 5:
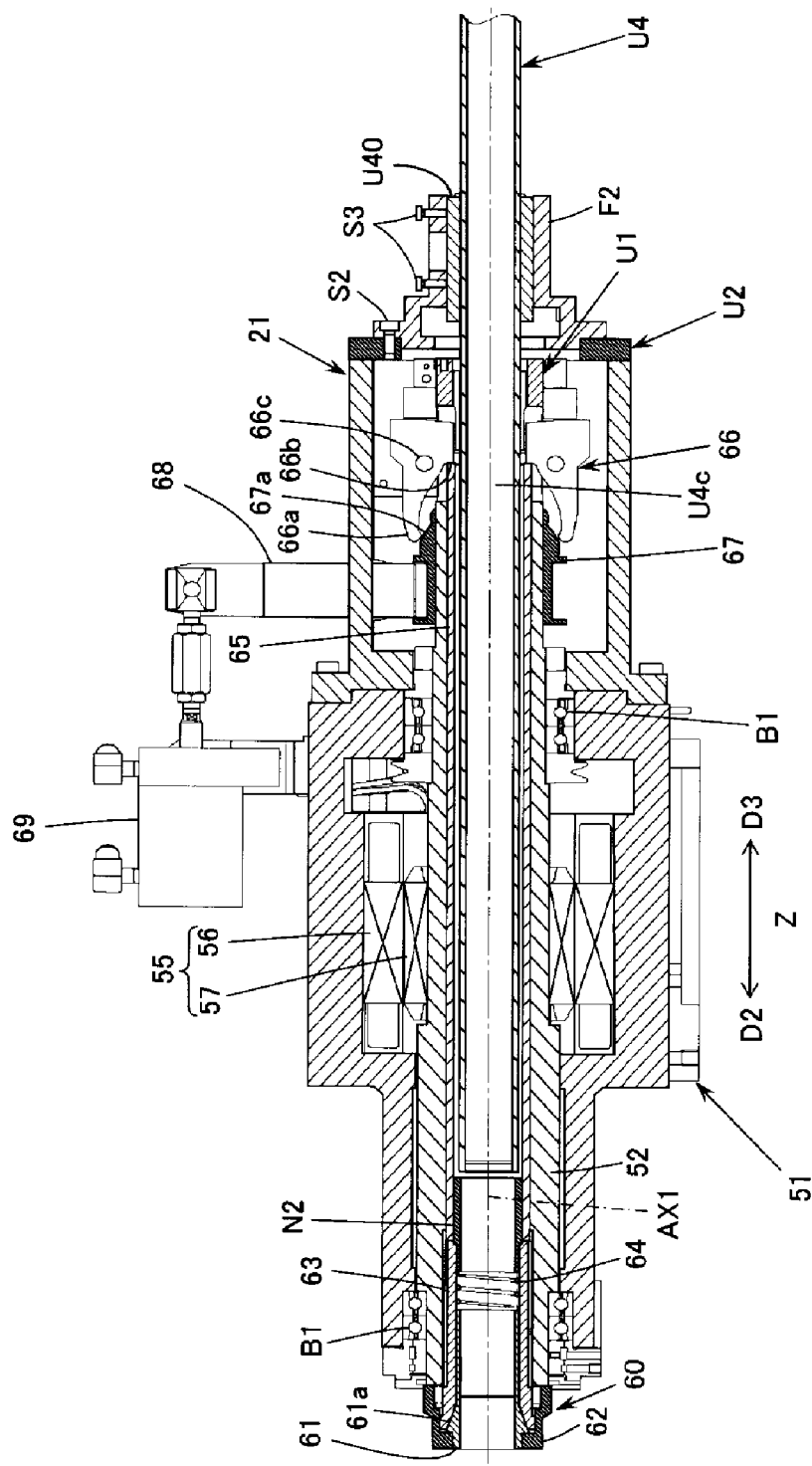
FIG. 5 is a longitudinal section view of the backworking unit where a product passage pipe is mounted.

FIG. 5 shows a longitudinal section view of the back-working unit on which the product passage pipe U4 is mounted. The passage pipe U4 is fastened to the flange F2 via a slit pipe U40. The passage pipe U4 is provided with a through-hole U4c through which the back-machined product (the workpiece W1) passes in the Z-axis direction to be ejected from the not-shown rear end thereof. The slit pipe U40 having a slit is outside the passage pipe U4 around the spindle axis AX1. The slit pipe U40 is tightened by the screws S3 of the flange F2 to fasten the passage pipe U4. A sleeve nut N2 for the passage pipe U4 is removably attached to the chuck sleeve 63 mounted on the front end of the sub spindle 52.

Figure 6:
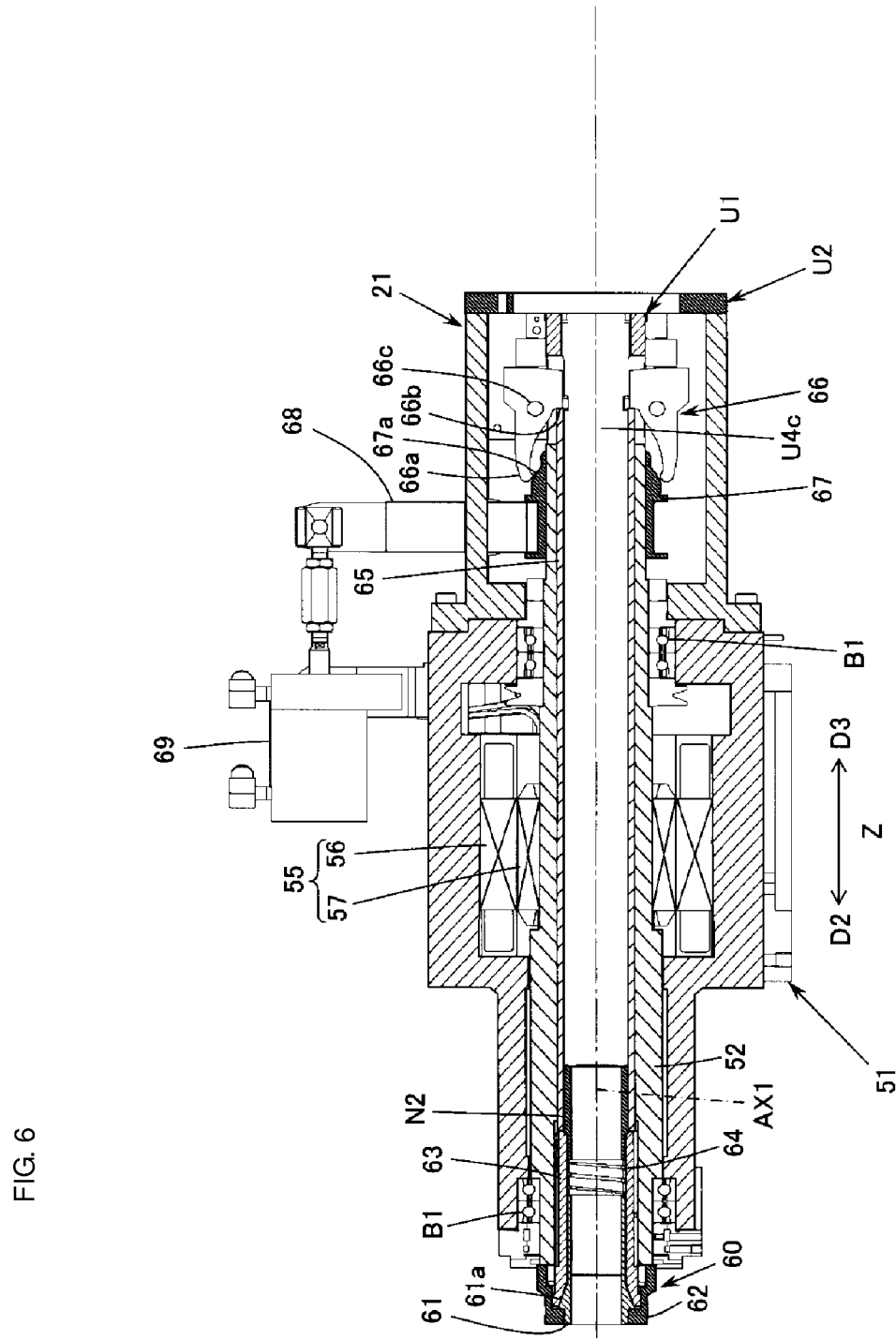
FIG. 6 is a longitudinal section view of the backworking unit where the product passage pipe is removed.

Removing the passage pipe U4 from the backworking unit 51 is being described. First, the screws S3 of the flange F2 are loosened at the rear end of the sub spindle 50 to release the passage pipe U4 from the slit pipe U40 toward the retracting direction D3. Then, the screw S2 is removed to release the flange F2 along with the slip pipe U40 from the supporting unit body 21. The slit pipe U40 is removed from the flange F2 as shown in FIG. 6.

Figure 7:
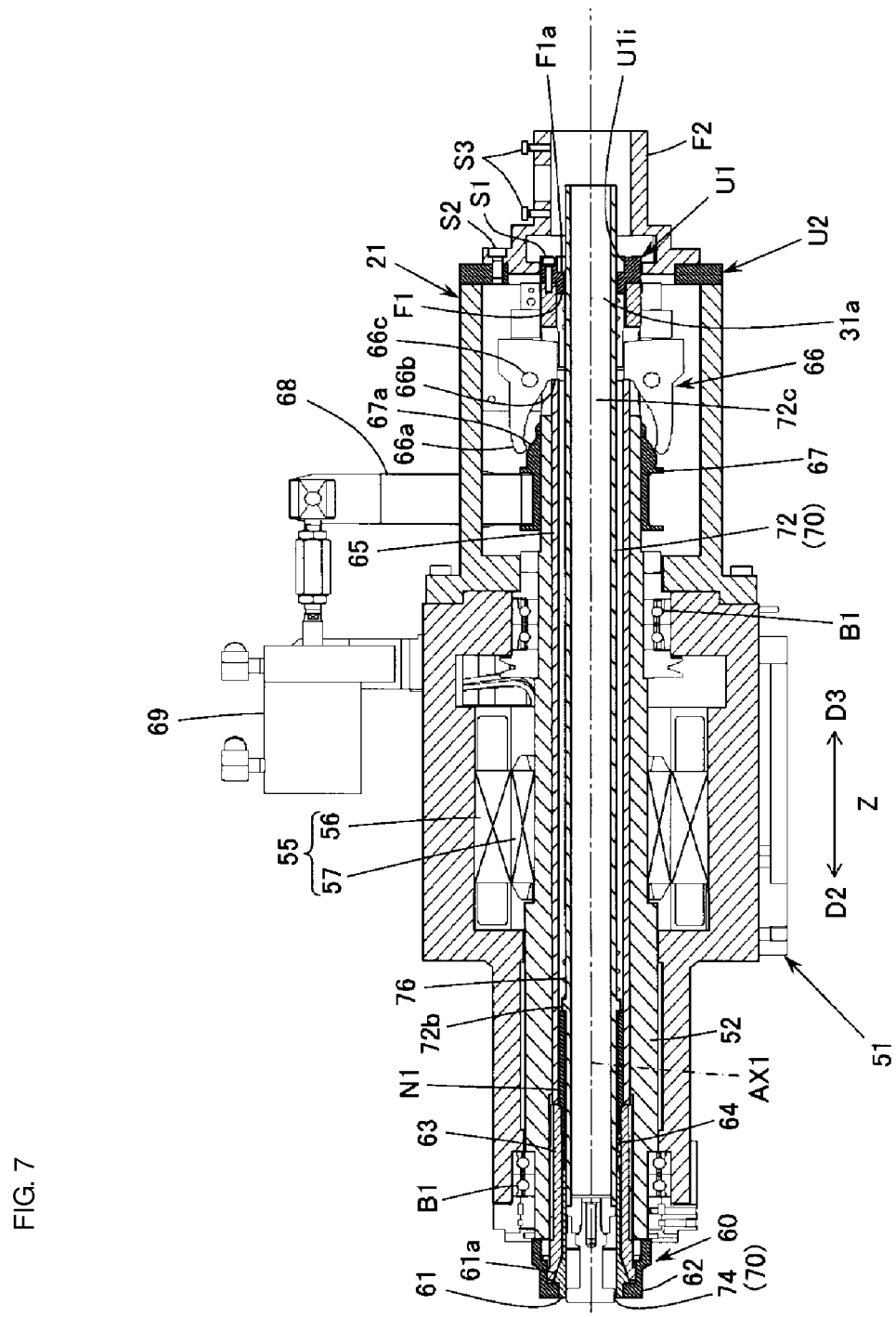
FIG. 7 is a longitudinal section view of the backworking unit where the fluid supplying unit is not mounted.

The cap 62 is removed from the front end of the sub spindle 52. The collet 61, the spring 64 for opening the collet, and the chuck sleeve 63 along with the sleeve nut N2 are removed out of the through-hole along the spindle axis AX1. The sleeve nut N2 is removed from the chuck sleeve 63. The sleeve nut N1 for the product ejector is mounted on the chuck sleeve 63. Then, the flange f1 for the product ejector is fastened to the rear end of the sub spindle 52 by the screw S1. The spring 76 for ejecting a product and the push sleeve 65 are inserted in the through-hole of the sub spindle 52 and the flange F1 along the spindle axis AX1. The collet 61, the spring 64, and the chuck sleeve 63 along with the sleeve nut N1 are inserted in the through-hole of the sub spindle 52 along the spindle axis AX1. The cap 62 is attached to the front end of the sub spindle 52. The flange F2 is fastened to the supporting unit body 21 of the supporting unit U2 by the screw S2 as shown in FIG. 7.

Finally, as shown in FIGS. 2 and 3, the outer pipe 32 along with the fluid pipe 31 is inserted into the flange F2 in the advancing direction D2 until the stop ring 32s hits the flange F2. The outer pipe 32 is fastened to the flange F2 by the screws S3. The front end of the fluid pipe 31 is inserted into the through-hole 72c of the ejecting shaft 72 and the labyrinth clearance C1 is thereby formed between the outer circumferential surface P1o of the insert P1 and the inner circumferential surface U1i of the flange F1.

A comparative example of mounting the fluid supplying unit to the supporting unit is being described referring to FIG. 8. FIG. 8 is a longitudinal section view of a comparative example of a backworking unit where a fluid supplying unit is mounted. First, an outer pipe 92 along with a fluid pipe 91 is inserted in the flange F2 in the advancing direction D2 until comes to the flange F1 of the rotating unit U1. The front end of the fluid pipe 91 is inserted in the through-hole 72c of the ejecting shaft 72 and the fluid supplying unit U9 comprising the fluid pipe 91 and the outer pipe 92 is mounted on the stationary flange F2. The clearance C9 is necessarily provided between the front end of the outer pipe 92 and the rear end of the flange F1. A wider clearance would leak more fluid, resulting in less oil or less air supplied to the collet and deficient removal of cut chips. A narrower clearance would cause an interference of the flange F1 of the rotating unit U1 with the stationary outer pipe 92 due to thermal expansion of the spindle. The clearance C9 is formed inside the backworking unit 51 and therefore not visually checked by using a measuring tool. Clearance is therefore provided in the following manner.

First, a nut N9 engaged with the outer periphery of the outer pipe 92 is turned until comes to the flange F2. With the nut N9 pressed against the flange F2, the outer pipe 92 is turned counterclockwise by for example ¼ round corresponding to a clearance of 0.25 mm. The nut N9 is fastened. Then the outer pipe 92 is fastened to the flange F2 by a screw S9. In this manner, the clearance C9 (0.25 mm for example) is formed between the stationary outer pipe 92 and the flange F1 of the rotating unit U1.

The clearance C9 is not visually checked by using a measuring tool. It is difficult for an inexperienced operator to adjust the clearance C9 to a constant value. It causes an increase in parts replacement man-hours and work time. A wider clearance unintentionally adjusted would leak more blow oil and more blow air. Leak amount is varied according to operators.

The embodiment of the invention eliminates such clearance adjustment process. The labyrinth clearance C1 is formed only by bringing the insert P1 into the recess F1a of the flange F1 in the Z-axis direction when the fluid supplying unit U3 is mounted on the supporting unit U2. Accordingly, the embodiment facilitates a process of mounting the fluid supplying unit to the supporting unit which rotatably supports the spindle. Further, parts replacement man-hours is reduced. Variation in leak amount due to different operators is prevented.

(4) Modified Embodiment

The invention may be embodied in various ways. For example, the invention is applied to the headstock where the fluid supplying unit is removably mounted.

The invention provides a machine tool capable of facilitating the process of mounting the fluid supplying unit to the supporting unit for rotatably supporting the spindle. A fundamental effect as above described is also available from any technology only consisting of the elements of the independent claim. The invention covers any mutually replaced or modified configuration in the embodiments or prior art.

What is claimed is:

1. A machine tool comprising:
   a rotating unit including a spindle provided with a chucking unit which releasably chucks a workpiece;
   a supporting unit which rotatably supports the spindle around an axis of the spindle, the supporting unit being removably mounted near the rear end of the spindle; and
   a fluid supplying unit removably mounted on a rear end of the supporting unit to allow fluid to flow inside the spindle toward the chucking unit;
   wherein, the fluid supplying unit has an insert to be received in the rotating unit in the direction of the axis of the spindle,
   wherein the rotating unit has an inner circumferential surface opposite an outer circumferential surface of the insert received in the rotating unit, and
   wherein a labyrinth clearance is formed between the outer circumferential surface of the insert and the inner circumferential surface of the rotating unit when the fluid supplying unit is mounted on the rear end of the supporting unit, the labyrinth clearance allowing rotation of the rotating unit and restricting leakage of the supplied fluid from inside the spindle when the rotating unit is rotated.

* * * * *